United States Patent [19]

Riggs, Jr.

[11] Patent Number: 4,746,438
[45] Date of Patent: May 24, 1988

[54] METHOD FOR PURIFYING CONTAMINATED WATERS

[75] Inventor: Olen L. Riggs, Jr., Oklahoma City, Okla.

[73] Assignee: Kerr-McGee Chemical Corporation, Oklahoma City, Okla.

[21] Appl. No.: 103,462

[22] Filed: Oct. 1, 1987

[51] Int. Cl.$^4$ ............................. C02F 1/20; C02F 1/42
[52] U.S. Cl. .................................................... 210/664
[58] Field of Search ....................... 210/664, 687, 749

[56] References Cited

U.S. PATENT DOCUMENTS 2,807,582  9/1957  Applebaum ......................... 210/664
3,536,613  10/1970  Kunin et al. .......................... 210/664

Primary Examiner—Ivars Cintins
Attorney, Agent, or Firm—William G. Addison; John P. Ward

[57] ABSTRACT

A method for substantially removing both alkaline earth metal cations and dissolved acidic gases from a water source contaminated therewith to produce a substantially nonscaling and noncorroding water supply therefrom. The method includes contacting the contaminated water source with an ion exchange resin to substantially remove the metal cation contaminants contained therein and produce a demineralized intermediate effluent having a pH of less than about 3.5. The demineralized intermediate effluent then is stripped of the acidic gas contaminants dissolved therein and the pH of the stripped effluent adjusted to a value in the range of from about 9.0 to about 10.0.

11 Claims, 1 Drawing Sheet

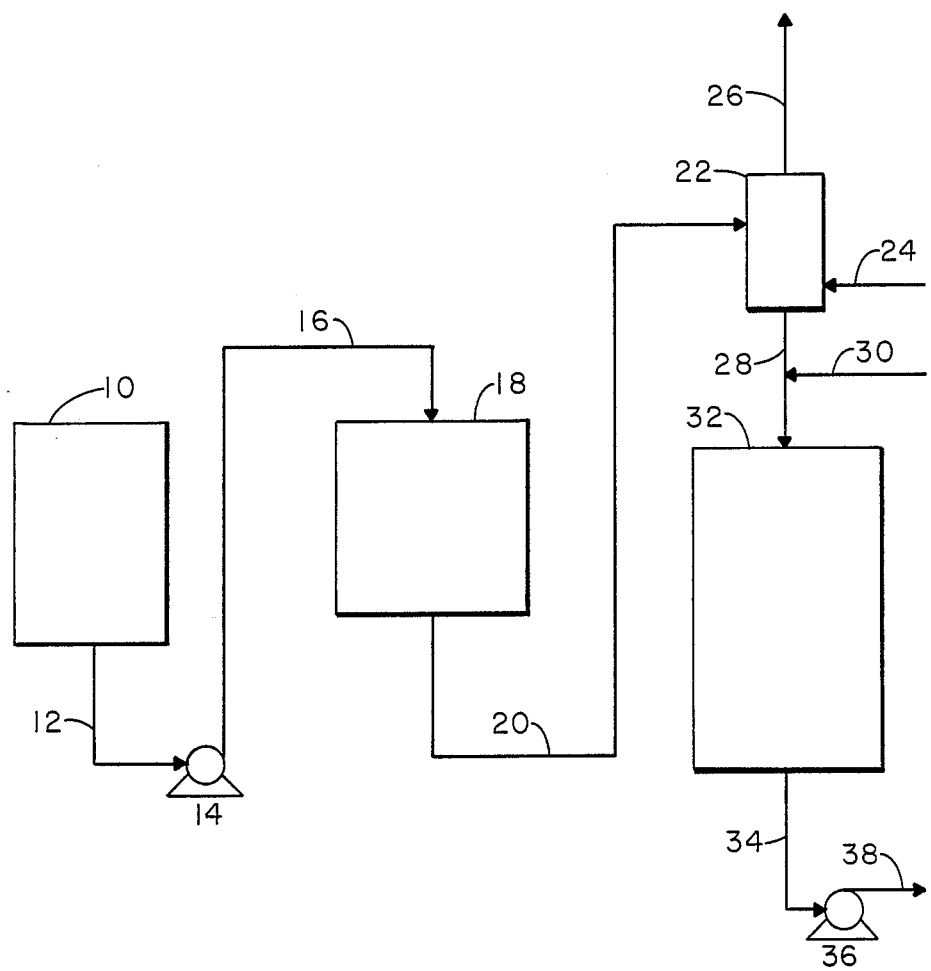

METHOD FOR PURIFYING CONTAMINATED WATERS

DESCRIPTION

1. Field of the Invention

The present invention relates to a method for substantially removing scale-forming metal cations and dissolved, corrosion-causing acidic gases from water sources contaminated therewith. More particularly, the present invention relates to a method of providing substantially nonscaling and noncorroding water supplies free of metal cation and acidic gas contaminants suitable for use as a supplemental source of boiler feed water.

2. Background of the Invention

In the processing of naturally occurring brines, which are rich in such elements as potassium, sodium, boron and the like, it is conventional practice to subject the brine to an initial evaporation step. The primary purpose of this initial evaporation step is to effect a concentration of the brine and produce a concentrated liquor for subsequent processing to recover the potassium, sodium, boron and the like, values therein. An additional result of this initial evaporation step is the recovery of water condensates which are suitable for use as plant process waters as well as providing a potential supplemental source of boiler feed water.

However, one drawback to the use of such water condensates, particularly as a supplemental source of boiler feed water, is the presence therein of scale-forming and corrosion-causing metal cation and acidic gas contaminants. Such contaminants can include metal cations such as calcium, magnesium and the like, and acidic gases such as hydrogen sulfide, carbon dioxide and the like. Such contaminants can, and often do, lead to scaling and corrosion of boiler equipment and, particularly, to scaling and corrosion in boiler heat exchange equipment. For example, water condensates recovered from the evaporation of naturally occurring brines typically can contain from about 12 to about 92 parts per million of calcium and from about 15 to about 60 parts per million of dissolved hydrogen sulfide. The effect of the presence of the hydrogen sulfide contaminant is particularly troublesome since at these concentrations corrosion of steel heat exchanger tubes can occur at an accelerated rate ranging from about 5 to about 60 miliinches per year and cause perforation of carbon steel heat exchanger tubes after only a few short weeks of service.

While methods such as ion exchange exist for effecting removal of metal cation contaminants from such water condensates, such methods do not provide for the removal of acidic gas contaminants. Thus, a need exists for an integrated method which can provide for the removal of both metal cation and acidic gas contaminants and thereby provide for a substantially nonscaling and noncorroding water supply, and particularly, a water supply suited for use as a supplemental source of nonscaling and noncorroding boiler feed water.

SUMMARY OF THE INVENTION

A method now has been discovered for the substantial removal of both metal cations and acidic gases from water sources contaminated therewith and for the production of substantially nonscaling and noncorroding water supplies, and particularly water supplies suitable for use as a supplemental source of boiler feed water. More particularly, the method comprises passing a water source contaminated with scale-forming metal cations and corrosion-causing acidic gases through a demineralization zone wherein the metal cation contaminants substantially are removed by ion exchange from the water source to provide a demineralized first effluent stream.

This demineralized first effluent stream is recovered from the demineralization zone and then introduced into a degasification zone. Within the degasification zone the demineralized first effluent stream is passed in a countercurrent flow relationship to, and in direct contact with, a degasification medium. The effect of contacting the first effluent stream with the degasification medium is the substantial removal of the dissolved acidic gas contaminants contained in the demineralized first effluent stream. The removal of the acidic gas contaminants from the first effluent stream results in the production of a demineralized and degasified second effluent stream which upon adjustment of the pH thereof with a pH adjusting agent yields a substantially nonscaling and noncorroding water supply suitable for use as a supplemental source of boiler feed water.

A critical feature of the method of the present invention resides in the discovery that the extent of removal of the acidic gas contaminants from the demineralized first effluent stream is dependant upon the pH value of the demineralized first effluent stream. Particularly, it has been discovered that if the demineralized first effluent stream recovered from the demineralization zone does not have a pH value of less than about 3.5, then the effluent stream recovered from the degasification zone, i.e., the second effluent stream, will contain a level of acidic gas contaminants sufficient to render said second effluent stream unsuitable for use as a supplemental source of boiler feed water.

BRIEF DESCRIPTION OF THE DRAWING

The single Figure, schematically illustrates the principal steps of the method of the present invention and the general flow of the metal cation and acidic gas contaminated water source undergoing treatment therein.

DETAILED DESCRIPTION OF THE INVENTION

A new and improved method now has been discovered for substantially removing both metal cation and acidic gas contaminants from a variety of water sources. The new and improved method of this invention particularly is suited for the treatment of contaminated aqueous condensates recovered from the partial concentration, through evaporation, of naturally occurring brines. More particularly, the method of this invention is especially suited to providing a substantially nonscaling and noncorroding water supply suitable for use as a supplemental source of boiler feed water from contaminated aqueous condensates such as those described immediately above.

Referring to the single Figure, water containing metal cation and acidic gas contaminants such as the contaminated aqueous condensates recovered from the partial concentration, through evaporation, of naturally occurring brines is withdrawn from a contaminated water storage zone 10 via a conduit 12. This contaminated water or aqueous condensate is conveyed via the conduit 12, a pump 14 and a conduit 16 to a demineralization zone 18. Typically the contaminated water or aqueous condensate will contain, as contaminants, scale-forming metal cations such as the alkaline earth metal cations of calcium, magnesium and the like, and corrosion-causing acidic gases such as hydrogen sulfide, carbon dioxide, and the like. Typically, the concentration of all metal cations, e.g., calcium, magnesium and the like, in the contaminated water or aqueous condensate can range from about 28 to about 110 parts per million parts of water while the concentration of all acidic gas contaminants contained therein can range from about 19 to about 106 parts per million parts of water.

Demineralization zone 18 can be a single vessel or two or more vessels operated in parallel and containing an ion exchange resin capable of removing the alkaline earth metal cation contaminants. Preferred ion exchange resins suitable for use in removing these metal cation contaminants in accordance with this step of the method of the present invention include the various commercially available strongly acidic styrene/divinyl benzene copolymers of varying degrees of cross-linking and sulfonic acid groups bound thereto. Representative examples of such copolymer resins are Amberlite IR-112 and Amberlite IR-120 (available from Rohm and Haas Company), Dowex 50 and Dowex 50W (available from The Dow Chemical Company), Ionac C-240 (available from Ionac Chemical Company) and the like. A particularly preferred ion exchange resin for use in the method of the present invention is Rohm and Haas' Amberlite IR-120 resin.

Weakly acidic ion exchange resins also can be employed. These resins can include those prepared by cross-linking unsaturated carboxylic acids such as divinylbenzene or ethylene dimethyl acrylate as well as those based on phenolic condensation reaction products and which incorporate the carboxylic acid group. Representative examples of these weakly acidic resins are Amberlite IRC-50 and Amberlite IRC-84, Ionac C-270, Dowex CCR-1, and the like. A more complete description of the strongly and weakly acidic ion exchange resins useful in the practice of the present invention is set forth in Kirk-Othmer, *Encyclopedia of Chemical Technology,* Vol. 2, 2Ed., pp 871–875 (1969) and *Perry's Chemical Engineers Handbook,* 4Ed., Section 16, p. 6 (1963) the teachings of both which are incorporated herein in their entirety by reference.

In the practice of the present invention, the contaminated water or aqueous condensate undergoing treatment is introduced into and passed through demineralization zone 18 at a rate of flow sufficient to provide a first effluent stream recovered from the demineralization zone 18 via a conduit 20 having a pH of less than about 3.5. For reasons not fully understood, the pH of this first effluent stream is the critical factor effecting the extent of removal of the acidic gas contaminants contained in this first effluent stream. In this regard, it has been found that only when this first effluent stream possesses a pH of less than about 3.5 can an amount of the acidic gas contaminants contained therein be removed to thereby provide a substantially noncorroding water supply and especially a water supply particularly suited for use as a supplemental source of boiler feed water.

The exact rate of flow of the contaminated water introduced into and passed through demineralization zone 18 will depend upon such factors as the concentration of the alkaline earth metal cation contaminants, the size of the vessel or vessels comprising demineralization zone 18, and the type or nature of the ion exchange resin employed. However, the determination of the precise rate of flow required to provide a first effluent stream having a pH of less than about the critical value of 3.5 readily is within the skill of those in this field.

The first effluent stream, containing a substantially reduced concentration of alkaline earth metal cation contaminants and having a pH of less than about 3.5 is withdrawn from demineralization zone 18 by way of the conduit 20. It is conveyed through this conduit 20 to a degasification zone 22 wherein it is contacted with a degasification medium. For purposes of the present invention, degasification zone 22 can comprise any simple stripping tower such as any of the known countercurrent flow packed or plate type stripping towers. The first effluent stream is introduced by way of the conduit 20 into an upper section of the degasification zone 22 and from there flows downwardly through the degasification zone 22 and into a lower section thereof. The degasification medium is introduced into the lower portion of degasification zone 22 by means of a conduit 24. The degasification medium flows upwardly through degasification zone 22, in a countercurrent relationship to the downwardly flowing demineralized first effluent stream, and into the upper section thereof. Contact between the descending demineralized first effluent stream and the upwardly flowing degasification medium results in a substantial stripping of the acidic gas contaminants contained in the first effluent stream. The degasification medium, containing a substantial portion of the acidic gas contaminants originally present in the first effluent stream, is removed from the upper section of degasification zone 22 by way of a conduit 26.

Broadly, any gaseous substance can be employed as the degasification medium for removing the acidic gas contaminants from the first effluent stream undergoing treatment within degasification zone 22. In general, however, it is preferred to employ such gaseous substances as steam, air, inert gases, and the like. For reasons of economy and convenience, air is the most preferred substance for use as the degasification medium in the practice of this invention.

As a result of the degasification of the first effluent stream within degasification zone 22, a reservoir of demineralized and degasified water or aqueous condensate collects in the lower portion of degasification zone 22. This reservoir is continuously withdrawn from degasification zone 22 via a conduit 28 as a demineralized and degasified second effluent stream.

A pH modifying agent is added to the demineralized and degasified water in amounts sufficient to adjust the pH thereof to a value in the range of from about 9.0 to about 10.0. Referring to the single Figure, therein is illustrated the addition of the pH modifying agent into conduit 28 via a conduit 30. In alternative embodiments the pH modifying agent also can be added directly into the reservoir of demineralized and degasified water contained in the lower portions of degasification zone 22 or to the treated water storage zone 32 by conduit means not shown.

The pH modifying agents useful in the practice of the present invention will be those compounds that are water soluble and basic in nature and capable of imparting to the demineralized and degasified water or aqueous condensate recovered from degasification zone 22 a pH in the range of from about 9.0 to about 10.0. Generally, such pH modifying agents can comprise any of the well known water soluble inorganic bases such as the alkali metal and alkaline earth metal hydroxides and carbonates, ammonia, ammonium hydroxide, hydrazine, and the like. Specific, but nonlimiting, examples of such bases include sodium hydroxide, potassium hydroxide, sodium carbonate, potassium carbonate, calcium hydroxide, gaseous ammonia, aqua ammonia (a dilute aqueous solution containing about 24 weight percent ammonia), ammonium hydroxide, hydrazine, and the like. A readily available and easily handled pH modifying agent is ammonia, either as a gas or in aqueous solution, and for these reasons comprises the preferred basic material for use as the pH modifying agent in the practice of this invention.

The demineralized, degasified and pH modified water or aqueous condensate retained in treated water storage zone 32 comprises a substantially nonscaling and noncorroding water supply and a most suitable supplemental source of boiler feed water. When employed as a supplemental source of boiler feed water, it readily can be conveyed from treated water storage zone 32 to a plant boiler system (not shown) by way of a conduit 34, a pump 36 and a conduit 38. Use of this treated water as a source of boiler feed water results in a substantial reduction in the formation of scale deposits in and corrosion of boiler equipment and particularly of boiler heat exchange equipment.

The following example is presented for purposes of illustration only. All parts are by weight unless otherwise specified.

EXAMPLE

An aqueous condensate contaminated with 60 parts per million of calcium ion, 40 parts per million of magnesium ion, 37 parts per million of dissolved hydrogen sulfide gas and 58 parts per million of dissolved carbon dioxide gas and having a pH of 6 is introduced into an upper section of a vertically positioned demineralization vessel containing a bed of a commercially available ion exchange resin. In this Example, the resin employed is Amberlite IR-120, a partially cross-linked styrene/vinylbenzene copolymer having sulfonic acid groups bound thereto.

The aqueous condensate is introduced into the demineralization vessel and passed through the resin bed at a rate of about 300 gallons per minute and under a pressure of about 10 psig. The aqueous condensate is passed downwardly through the resin bed wherein the calcium and magnesium ions, as well as any other alkaline earth metal cations present, are removed. The demineralized aqueous condensate is removed from a lower section of the demineralization vessel. The pH of this condensate is 2.9.

The demineralized aqueous condensate then is conveyed to and introduced into an upper section of a vertically positioned degasification vessel. The upper section of this vessel is filled with a bed of saddle-type packing and the demineralized effluent stream is percolated downwardly through this packing under atmospheric pressure conditions. A degasification medium, e.g., air, is introduced into the degasification vessel at the base of the bed of saddle packing and passed upwardly through and in countercurrent flow to the descending aqueous condensate. Direct contact between the degasification medium and the aqueous condensate effects removal of the dissolved hydrogen sulfide and carbon dioxide gases which are taken up by the degasification medium. As the degasification medium exits the bed of packing it is exhausted to the atmosphere.

The demineralized and degasified aqueous condensate exiting the packing is collected in a reservoir comprising a lower section of the degasification vessel wherein 26 parts per million of a pH adjusting agent, i.e., ammonia, are injected to adjust the pH of the condensate to a value of 9.4. Analysis of this condensate reveals it to contain 0.1 parts per million of calcium ion, no detectable magnesium and no detectable hydrogen sulfide and carbon dioxide gases. Submersion of sample carbon steel coupons in this condensate for a period of 120 days discloses a reduced corrosion rate of 0.4 milliinches per year. This reduced corrosion rate represents a significant improvement compared to the corrosion rate of 250 milliinches per year obtained for similar sample coupons submerged in the original contaminated condensate.

COMPARATIVE EXAMPLE

To demonstrate the criticality of the pH of the demineralized aqueous condensate recovered from the demineralization vessel on the subsequent removal of dissolved hydrogen sulfide and carbon dioxide a comparative example was performed. In this comparative example a similar contaminated aqueous condensate, and the same or nearly the same processing conditions and equipment are employed as in the Example above. The single exception is that the contaminated condensate is introduced into the demineralization vessel and passed through the resin bed at a rate of about 330 gallons per minute and under a pressure of about 10 psig. The demineralized aqueous condensate recovered under these operating conditions has a pH of above about 5.1.

After degasification of this condensate and adjustment of its pH to 9.5 using ammonia, analysis of the final demineralized and degasified condensate reveals it to contain about 2.6 parts per million of calcium ion, about 3.0 parts per million of magnesium ion, about 0.5 parts per million of dissolved hydrogen sulfide and about 22 parts per million of dissolved carbon dioxide. Comparison of this analysis with that for the demineralized and degasified condensate product from the Example illustrating the present invention reveals the criticality of the pH of the aqueous condensate subsequently subjected to degasification. As is clear from these examples, only when the pH of the condensate is less than about 3.5 can the dissolved acidic gases be substantially completely removed and thereby provide a water source which is substantially nonscaling and noncorroding.

While the invention has been illustrated and described with respect to what at present are believed to be the preferred embodiments thereof, it is to be understood that this invention is not to be limited thereto and that changes may be made in and to the invention without departing from the spirit and scope thereof except as provided in the following claims.

I claim:

1. A method for preparing a substantially nonscaling and noncorroding boiler feed water supply from a water source contaminated with alkaline earth metal cations and dissolved hydrogen sulfide and carbon dioxide gases comprising the steps of:
   passing said contaminated water source through a demineralization zone, the contaminated water source being passed through the demineralization zone at a rate of flow sufficient to effect removal of a substantial portion of the alkaline earth metal cation contaminants therefrom to provide a demineralized first effluent water stream having a pH of less than about 3.5 and containing the dissolved hydrogen sulfide and carbon dioxide gaseous contaminants;

recovering the demineralized first effluent water stream from the demineralization zone;

introducing the recovered demineralized first effluent water stream into a degasification zone, the first effluent water stream being introduced into the degasification zone in a countercurrent flow relationship with a degasification medium to effect removal of the dissolved hydrogen sulfide and carbon dioxide gaseous contaminants therefrom and to provide a demineralized and degasified second effluent water stream; and recovering the demineralized and degasified second effluent water stream from the degasification zone and introducing into the second effluent water stream a pH modifying agent in an amount sufficient to adjust the pH of the second effluent water stream to a value in the range of from about 9.0 to about 10.0 and provide a pH adjusted effluent stream comprising the nonscaling and noncorroding boiler feed water supply.

2. The method of claim 1 wherein the water source contaminated with alkaline earth metal cations and dissolved hydrogen sulfide and carbon dioxide gases is an aqueous condensate resulting from the evaporative concentration of a naturally occurring brine.

3. The method of claim 2 wherein the aqueous condensate is a condensate recovered from a second effect of a triple effect evaporative process for concentrating a naturally occurring brine.

4. The method of claim 2 wherein the aqueous condensate is characterized by containing a total alkaline earth metal cation concentration ranging from about 28 to about 110 parts per million and a combined hydrogen sulfide and carbon dioxide gas concentration ranging from about 19 to about 106 parts per million based on the total parts of said condensate.

5. The method of claim 1 wherein the demineralization zone comprises at least one zone containing a cationic ion exchange resin.

6. The method of claim 5 wherein the cationic exchange resin is a copolymer of styrene and divinylbenzene having bound thereto functional groups selected from the group consisting of sulfonic, carboxylic, phosphonic and phosphinic acid groups.

7. The method of claim 5 wherein the cationic ion exchange resin is a copolymer of styrene and divinylbenzene having bound thereto sulfonic acid groups.

8. The method of claim 1 wherein the degasification medium is at least one gaseous substance selected from the group consisting of steam, an inert gas and air.

9. The method of claim 8 wherein the degasification medium is air.

10. The method of claim 1 wherein the pH modifying agent added to the demineralized and degasified second effluent water stream is a water soluble ammonium compound.

11. The method of claim 10 wherein the water soluble ammonium compound is ammonia.

* * * * *